Patented Feb. 24, 1925.

1,527,951

UNITED STATES PATENT OFFICE.

ADOLF FELDT, OF BERLIN, GERMANY, ASSIGNOR TO CHEMISCHE FABRIK AUF ACTIEN (VORM. E. SCHERING), OF BERLIN, GERMANY.

DERIVATIVES OF AMINOARGENTOMERCAPTOBENZENE CARBOXYLIC ACID.

No Drawing. Application filed June 21, 1924. Serial No. 721,496.

*To all whom it may concern:*

Be it known that I, ADOLF FELDT, citizen of Germany, residing at Berlin, Germany, have invented a new and useful Improvement in Derivatives of Aminoargentomercaptobenzene Carboxylic Acid, of which the following is a specification.

The 4-amino-2-argentomercaptobenzene-1-carboxylic acid, described in the United States Patent 1,439,624, to Adolf Feldt, December 19, 1922 and the alkali metal salts of this compound are soluble in water with difficulty.

According to my invention the said compounds can be made easily soluble in water and therefore suitable for intravenous injection by transforming them into the corresponding formaldehydesulphoxylates.

The new derivatives are light yellow powders insoluble in organic solvents and forming alkali metal salts which are easily soluble in water.

The following example may illustrate the process:

An aqueous suspension of 28,8 grams finely divided sodium 4-amino-2-argentomercaptobenzene-1-carboxylate are treated with 10,1 grams of sodium formaldehydesulphoxylate dissolved in 15 cubic centimetres distilled water. The mixture is, while thoroughly stirring, heated slowly to 65° C.; sodium aminoargentomercaptobenzenecarboxylate is decomposed by the sodium formaldehydesulphoxylate and becomes dissolved. The cooled solution is poured into 500 cubic centimetres alcohol while constantly stirring. The precipitate is filtered off, again dissolved in 500 cubic centimetres water and poured into 500 cubic centimetres alcohol and after washing with alcohol is dried. Analysis gives a silver content of 27,8 per cent. The compound has the probable formula

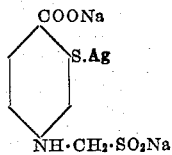

The compound may also be obtained by treating 4-amino-2-mercaptobenzene-1-carboxylic acid with sodium formaldehydesulphoxylate and allowing the resultant compound to react upon a salt of silver and then transforming the acid into an alkali metal salt.

I claim as my invention:

1. As new products the formaldehydesulfoxylates of 4-amino-2-argentomercaptobenzene-1-carboxylic acid, being light yellow powders insoluble in organic solvents and forming alkali salts which are easily soluble in water.

2. As a new product the sodium formaldehydesulphoxylate of the sodium salt of 4-amino-2-argentomercaptobenzene-1-carboxylic acid, corresponding to the formula

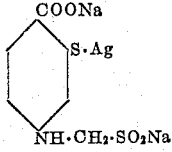

being a light yellow powder easily soluble in water, insoluble in organic solvents, and containing 27,8 per cent of silver.

In testimony whereof I have hereunto set my signature.

ADOLF FELDT.